US008261967B1

(12) United States Patent
Long et al.

(10) Patent No.: US 8,261,967 B1
(45) Date of Patent: Sep. 11, 2012

(54) TECHNIQUES FOR INTERACTIVELY COUPLING ELECTRONIC CONTENT WITH PRINTED MEDIA (75) Inventors: Greg Long, Moraga, CA (US); Taya Harden, San Francisco, CA (US); Michael Spiegelman, San Francisco, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 210 days.

(21) Appl. No.: 11/489,887

(22) Filed: Jul. 19, 2006

(51) Int. Cl.
*G06F 17/00* (2006.01)
(52) U.S. Cl. ...................................................... 235/375
(58) Field of Classification Search .................. 235/375, 235/376; 434/308, 317
See application file for complete search history.

(56) References Cited

U.S. PATENT DOCUMENTS

| | | |
|---|---|---|
| 2,182,334 A | 12/1939 | Crespo |
| 2,932,907 A | 4/1960 | Stieber et al. |
| 3,292,489 A | 12/1966 | Johnson et al. |
| 3,304,612 A | 2/1967 | Proctor et al. |
| 3,530,241 A | 9/1970 | Ellis |
| 3,591,718 A | 7/1971 | Asano et al. |
| 3,657,812 A | 4/1972 | Lee |
| 3,782,734 A | 1/1974 | Krainin |
| 3,798,370 A | 3/1974 | Hurst |
| 3,888,311 A | 6/1975 | Cooke, Jr. |
| 3,911,215 A | 10/1975 | Hurst et al. |
| 3,921,165 A | 11/1975 | Dym |
| 4,079,194 A | 3/1978 | Kley |
| 4,220,815 A | 9/1980 | Gibson et al. |
| 4,318,096 A | 3/1982 | Thornburg et al. |
| 4,337,375 A | 6/1982 | Freeman |
| 4,375,058 A | 2/1983 | Bouma et al. |
| 4,425,099 A | 1/1984 | Naden |
| 4,464,118 A | 8/1984 | Scott et al. |
| 4,492,819 A | 1/1985 | Rodgers et al. |
| 4,570,149 A | 2/1986 | Thornburg et al. |
| 4,603,231 A | 7/1986 | Reiffel et al. |
| 4,604,058 A | 8/1986 | Fisher et al. |
| 4,604,065 A | 8/1986 | Frazer et al. |
| 4,619,539 A | 10/1986 | Kageyama |
| 4,627,819 A | 12/1986 | Burrows |
| 4,630,209 A | 12/1986 | Saito et al. |
| 4,650,926 A | 3/1987 | Nakamura et al. |
| 4,686,332 A | 8/1987 | Greanias et al. |
| 4,706,090 A | 11/1987 | Hashiguchi et al. |
| 4,739,299 A | 4/1988 | Eventoff et al. |

(Continued)

FOREIGN PATENT DOCUMENTS

CN 1142471 6/1999

(Continued)

OTHER PUBLICATIONS

British Micro, "Operating Guide to Grafpad", 1982, 28 pp.
Kramer, Translucent Patches-Dissolving Windows:, Nov. 2, 1994 Symposium on user interface software and technology, pp. 121-130, XP00197943.

(Continued)

*Primary Examiner* — Seung Lee (57) ABSTRACT

A technique for interactively coupling electronic content to printed or written content, in accordance with one embodiment of the present invention, includes use of a computing device and a pre-printed control panel. The control panel includes graphic representations overlaid on unique coded patterns. Each unique coded pattern is associated with a particular function or datum. The control panel is used to input an identifier of a written or printed content to the computing device. In response thereto, the computing device interactively delivers the electronic content related to the particular written or printed content.

19 Claims, 6 Drawing Sheets

U.S. PATENT DOCUMENTS

| | | | |
|---|---|---|---|
| 4,748,318 A | 5/1988 | Bearden et al. |
| 4,787,040 A | 11/1988 | Ames et al. |
| 4,793,810 A | 12/1988 | Beasley, Jr. |
| 4,839,634 A | 6/1989 | More et al. |
| 4,841,387 A | 6/1989 | Rindfuss |
| 4,853,494 A | 8/1989 | Suzuki |
| 4,853,498 A | 8/1989 | Meadows et al. |
| 4,853,499 A | 8/1989 | Watson |
| 4,880,968 A | 11/1989 | Kwang-Chien |
| 4,913,463 A | 4/1990 | Tlapek et al. |
| 4,922,061 A | 5/1990 | Meadows et al. |
| 4,924,387 A | 5/1990 | Jeppesen |
| 4,964,167 A | 10/1990 | Kunizawa et al. |
| 4,972,496 A | 11/1990 | Sklarew |
| 4,990,093 A | 2/1991 | Frazer et al. |
| 4,991,987 A | 2/1991 | Holloway et al. |
| 5,007,085 A | 4/1991 | Greanias et al. |
| 5,030,117 A | 7/1991 | Delorme |
| 5,053,585 A | 10/1991 | Yaniger |
| 5,057,024 A | 10/1991 | Sprott et al. |
| 5,059,126 A | 10/1991 | Kimball |
| 5,113,178 A | 5/1992 | Yasuda et al. |
| 5,117,071 A | 5/1992 | Greanias et al. |
| 5,128,525 A | 7/1992 | Stearns et al. |
| 5,149,919 A | 9/1992 | Greanias et al. |
| 5,157,384 A | 10/1992 | Greanias et al. |
| 5,168,147 A | 12/1992 | Bloomberg |
| 5,184,003 A | 2/1993 | McMillin et al. |
| 5,194,852 A | 3/1993 | More et al. |
| 5,209,665 A | 5/1993 | Billings et al. |
| 5,217,376 A | 6/1993 | Gosselin |
| 5,217,378 A | 6/1993 | Donovan |
| 5,220,136 A | 6/1993 | Kent |
| 5,220,649 A | 6/1993 | Forcier |
| 5,221,833 A | 6/1993 | Hecht |
| 5,250,930 A | 10/1993 | Yoshida et al. |
| 5,260,697 A | 11/1993 | Barrett et al. |
| 5,294,792 A | 3/1994 | Lewis et al. |
| 5,301,243 A | 4/1994 | Olschafskie et al. |
| 5,314,336 A | 5/1994 | Diamond et al. |
| 5,356,296 A | 10/1994 | Pierce et al. |
| 5,401,916 A | 3/1995 | Crooks |
| 5,406,307 A | 4/1995 | Hirayama et al. |
| 5,409,381 A | 4/1995 | Sundberg et al. |
| 5,413,486 A | 5/1995 | Burrows et al. |
| 5,417,575 A | 5/1995 | McTaggart |
| 5,438,168 A | 8/1995 | Wolfe et al. |
| 5,438,662 A | 8/1995 | Randall |
| 5,466,158 A | 11/1995 | Smith, III |
| 5,474,457 A | 12/1995 | Bromley |
| 5,480,306 A | 1/1996 | Liu |
| 5,484,292 A | 1/1996 | McTaggart |
| 5,485,176 A | 1/1996 | Ohara et al. |
| 5,509,087 A | 4/1996 | Nagamine |
| 5,510,606 A | 4/1996 | Worthington et al. |
| 5,517,579 A | 5/1996 | Baron et al. |
| 5,520,544 A | 5/1996 | Manico et al. |
| 5,561,446 A | 10/1996 | Montlick |
| 5,572,651 A | 11/1996 | Weber et al. |
| 5,574,519 A | 11/1996 | Manico et al. |
| 5,574,804 A | 11/1996 | Olschafskie et al. |
| 5,575,659 A | 11/1996 | King et al. |
| 5,596,698 A | 1/1997 | Morgan |
| 5,604,517 A | 2/1997 | Filo |
| 5,624,265 A | 4/1997 | Redford et al. |
| 5,629,499 A | 5/1997 | Flickinger et al. |
| 5,635,726 A | 6/1997 | Zavislan et al. |
| 5,636,995 A | 6/1997 | Sharpe, III et al. |
| 5,640,193 A | 6/1997 | Wellner |
| 5,649,023 A | 7/1997 | Barbara et al. |
| 5,652,412 A | 7/1997 | Lazzouni et al. |
| 5,652,714 A | 7/1997 | Peterson et al. |
| 5,661,506 A | 8/1997 | Lazzouni et al. |
| 5,663,748 A | 9/1997 | Huffman et al. |
| 5,666,214 A | 9/1997 | MacKinlay et al. |
| 5,686,705 A | 11/1997 | Conroy et al. |
| 5,689,667 A | 11/1997 | Kurtenbach |
| 5,694,102 A | 12/1997 | Hecht |
| 5,697,793 A | 12/1997 | Huffman et al. |
| 5,698,822 A | 12/1997 | Haneda et al. |
| 5,717,939 A | 2/1998 | Bricklin et al. |
| 5,730,602 A | 3/1998 | Gierhart et al. |
| 5,739,814 A | 4/1998 | Ohara et al. |
| 5,757,361 A | 5/1998 | Hirshik |
| 5,760,773 A | 6/1998 | Berman et al. |
| 5,767,457 A | 6/1998 | Gerpheide et al. |
| 5,788,508 A | 8/1998 | Lee et al. |
| 5,790,114 A | 8/1998 | Geaghan et al. |
| 5,801,687 A | 9/1998 | Peterson et al. |
| 5,805,167 A | 9/1998 | van Cruyningen |
| 5,835,726 A | 11/1998 | Shwed et al. |
| 5,844,483 A | 12/1998 | Boley |
| 5,847,698 A | 12/1998 | Reavey et al. |
| 5,852,434 A | 12/1998 | Sekendur |
| 5,855,483 A | 1/1999 | Collins et al. |
| 5,877,458 A | 3/1999 | Flowers |
| 5,889,506 A | 3/1999 | Lopresti et al. |
| 5,896,403 A | 4/1999 | Nagasaki et al. |
| 5,902,968 A | 5/1999 | Sato et al. |
| 5,903,729 A | 5/1999 | Reber et al. |
| 5,910,009 A | 6/1999 | Leff et al. |
| 5,913,629 A | 6/1999 | Hazzard |
| 5,914,707 A | 6/1999 | Kono |
| 5,932,863 A | 8/1999 | Rathus et al. |
| 5,933,829 A | 8/1999 | Durst et al. |
| 5,945,656 A | 8/1999 | Lemelson et al. |
| 5,951,298 A | 9/1999 | Werzberger |
| 5,957,697 A | 9/1999 | Iggulden et al. |
| 5,960,124 A | 9/1999 | Taguchi et al. |
| 5,963,199 A | 10/1999 | Kato et al. |
| 5,963,208 A | 10/1999 | Dolan et al. |
| 5,973,420 A | 10/1999 | Kaiserman et al. |
| 5,974,558 A | 10/1999 | Cortopassi et al. |
| 5,978,773 A | 11/1999 | Hudetz et al. |
| 5,992,817 A | 11/1999 | Klitsner et al. |
| 5,997,309 A | 12/1999 | Metheny et al. |
| 6,000,613 A | 12/1999 | Hecht et al. |
| 6,000,621 A | 12/1999 | Hecht et al. |
| 6,002,387 A | 12/1999 | Ronkka et al. |
| 6,008,799 A | 12/1999 | Van Kleeck |
| 6,009,393 A | 12/1999 | Sasaki |
| 6,011,949 A * | 1/2000 | Shimomukai ............... 434/358 |
| 6,018,656 A | 1/2000 | Shirai |
| 6,020,895 A | 2/2000 | Azami |
| 6,021,306 A | 2/2000 | McTaggart |
| 6,041,215 A | 3/2000 | Maddrell et al. |
| 6,050,735 A | 4/2000 | Hazzard |
| 6,052,117 A | 4/2000 | Ohara et al. |
| 6,064,855 A | 5/2000 | Ho |
| 6,072,476 A | 6/2000 | Harada et al. |
| 6,076,734 A | 6/2000 | Dougherty et al. |
| 6,076,738 A | 6/2000 | Bloomberg et al. |
| 6,081,261 A | 6/2000 | Wolff et al. |
| 6,088,023 A | 7/2000 | Louis et al. |
| 6,089,943 A | 7/2000 | Lo |
| 6,094,197 A | 7/2000 | Buxton et al. |
| 6,100,877 A | 8/2000 | Chery et al. |
| 6,104,387 A | 8/2000 | Chery et al. |
| 6,104,388 A | 8/2000 | Nagai et al. |
| 6,119,944 A | 9/2000 | Mulla et al. |
| 6,124,851 A | 9/2000 | Jacobson |
| 6,130,666 A | 10/2000 | Persidsky |
| 6,144,371 A | 11/2000 | Clary et al. |
| 6,148,173 A | 11/2000 | Bell |
| 6,164,534 A | 12/2000 | Rathus et al. |
| 6,164,541 A | 12/2000 | Dougherty et al. |
| 6,181,329 B1 | 1/2001 | Stork et al. |
| 6,183,262 B1 | 2/2001 | Tseng |
| 6,188,983 B1 | 2/2001 | Hanson |
| 6,199,042 B1 | 3/2001 | Kurzweil |
| 6,199,048 B1 | 3/2001 | Hudetz et al. |
| 6,201,903 B1 | 3/2001 | Wolff et al. |
| 6,201,947 B1 | 3/2001 | Hur et al. |
| 6,208,771 B1 | 3/2001 | Jared et al. |
| 6,215,476 B1 | 4/2001 | Depew et al. |
| 6,215,901 B1 | 4/2001 | Schwartz |
| 6,218,964 B1 | 4/2001 | Ellis |

| | | |
|---|---|---|
| 6,239,792 B1 | 5/2001 | Yanagisawa et al. |
| 6,241,528 B1 | 6/2001 | Myers |
| 6,252,564 B1 | 6/2001 | Albert et al. |
| 6,256,638 B1 | 7/2001 | Dougherty et al. |
| 6,262,711 B1 | 7/2001 | Cohen et al. |
| 6,262,719 B1 | 7/2001 | Bi et al. |
| 6,275,301 B1 | 8/2001 | Bobrow et al. |
| 6,295,439 B1 | 9/2001 | Bejar et al. |
| 6,297,812 B1 | 10/2001 | Ohara et al. |
| 6,297,824 B1 | 10/2001 | Hearst et al. |
| 6,304,667 B1 | 10/2001 | Reitano |
| 6,304,898 B1 | 10/2001 | Shiigi |
| 6,304,989 B1 | 10/2001 | Kraus et al. |
| 6,309,122 B1 | 10/2001 | Wang |
| 6,313,828 B1 | 11/2001 | Chombo |
| 6,322,369 B1 | 11/2001 | Patterson et al. |
| 6,330,976 B1 * | 12/2001 | Dymetman et al. .......... 235/487 |
| 6,331,865 B1 | 12/2001 | Sachs et al. |
| 6,331,867 B1 | 12/2001 | Eberhard et al. |
| 6,335,727 B1 | 1/2002 | Morishita et al. |
| 6,349,194 B1 | 2/2002 | Nozaki et al. |
| 6,363,239 B1 | 3/2002 | Tutt et al. |
| 6,388,681 B1 | 5/2002 | Nozaki |
| 6,392,632 B1 | 5/2002 | Lee |
| 6,396,481 B1 | 5/2002 | Challa et al. |
| 6,405,167 B1 | 6/2002 | Cogliano |
| 6,415,108 B1 | 7/2002 | Kamishima et al. |
| 6,418,326 B1 | 7/2002 | Heinonen et al. |
| 6,421,524 B1 | 7/2002 | Padgett |
| 6,431,439 B1 | 8/2002 | Suer et al. |
| 6,434,561 B1 | 8/2002 | Durst, Jr. et al. |
| 6,441,807 B1 | 8/2002 | Yamaguchi |
| 6,442,350 B1 | 8/2002 | Stephany et al. |
| 6,456,749 B1 | 9/2002 | Kasabach et al. |
| 6,460,155 B1 | 10/2002 | Nagasaki et al. |
| 6,473,072 B1 | 10/2002 | Comiskey et al. |
| 6,476,834 B1 | 11/2002 | Doval et al. |
| 6,493,734 B1 | 12/2002 | Sachs et al. |
| 6,502,756 B1 | 1/2003 | Fahraeus |
| 6,509,893 B1 | 1/2003 | Akhlagi et al. |
| 6,516,181 B1 | 2/2003 | Kirwan |
| 6,529,920 B1 | 3/2003 | Arons et al. |
| 6,532,314 B1 | 3/2003 | Plain et al. |
| 6,535,799 B2 | 3/2003 | Levanoni et al. |
| 6,556,188 B1 | 4/2003 | Cordner |
| 6,564,249 B2 | 5/2003 | Shiigi |
| 6,577,299 B1 | 6/2003 | Schiller et al. |
| 6,584,249 B1 | 6/2003 | Gu et al. |
| 6,587,859 B2 | 7/2003 | Dougherty et al. |
| 6,592,039 B1 | 7/2003 | Smith et al. |
| 6,593,908 B1 | 7/2003 | Borgstrom et al. |
| 6,608,618 B2 | 8/2003 | Wood et al. |
| 6,609,653 B1 | 8/2003 | Lapstun et al. |
| 6,627,870 B1 | 9/2003 | Lapstun et al. |
| 6,628,847 B1 | 9/2003 | Kasabach et al. |
| 6,641,401 B2 | 11/2003 | Wood et al. |
| 6,644,545 B1 | 11/2003 | Lapstun et al. |
| 6,647,369 B1 | 11/2003 | Silverbrook et al. |
| 6,651,879 B2 | 11/2003 | Lapstun et al. |
| 6,661,405 B1 | 12/2003 | Flowers |
| 6,663,008 B1 | 12/2003 | Pettersson et al. |
| 6,665,490 B2 | 12/2003 | Copperman et al. |
| 6,668,156 B2 | 12/2003 | Lynch et al. |
| 6,676,411 B2 | 1/2004 | Rehkemper et al. |
| 6,678,499 B1 | 1/2004 | Silverbrook et al. |
| 6,689,966 B2 | 2/2004 | Wiebe |
| 6,724,373 B1 | 4/2004 | O'Neill, Jr. et al. |
| 6,724,374 B1 | 4/2004 | Lapstun et al. |
| 6,732,927 B2 | 5/2004 | Olsson et al. |
| 6,738,050 B2 | 5/2004 | Comiskey et al. |
| 6,738,053 B1 | 5/2004 | Borgstrom et al. |
| 6,750,978 B1 * | 6/2004 | Marggraff et al. .......... 358/1.12 |
| 6,752,557 B1 | 6/2004 | Hsieh |
| 6,755,584 B2 | 6/2004 | O'Brien et al. |
| 6,763,995 B1 | 7/2004 | Song |
| 6,771,283 B2 | 8/2004 | Carro |
| 6,773,185 B1 | 8/2004 | Hsieh |
| 6,798,403 B2 | 9/2004 | Kitada et al. |
| 6,816,702 B2 | 11/2004 | Kuntz et al. |
| 6,831,632 B2 | 12/2004 | Vardi |
| 6,847,883 B1 | 1/2005 | Walmsley et al. |
| 6,853,293 B2 | 2/2005 | Swartz et al. |
| 6,874,883 B1 | 4/2005 | Shigemura et al. |
| 6,885,878 B1 | 4/2005 | Borgstrom et al. |
| 6,886,036 B1 | 4/2005 | Santamaki et al. |
| 6,915,103 B2 * | 7/2005 | Blume .......................... 434/317 |
| 6,933,928 B1 | 8/2005 | Lilienthal |
| 6,938,222 B2 | 8/2005 | Hullender et al. |
| 6,940,491 B2 | 9/2005 | Carro |
| 6,947,027 B2 | 9/2005 | Lapstun et al. |
| 6,956,562 B1 | 10/2005 | O'Hara et al. |
| 6,965,454 B1 | 11/2005 | Silverbrook et al. |
| 6,966,495 B2 | 11/2005 | Lynggaard et al. |
| 6,966,777 B2 | 11/2005 | Robotham |
| 6,982,703 B2 | 1/2006 | Lapstun et al. |
| 6,985,138 B2 | 1/2006 | Charlier |
| 6,989,816 B1 | 1/2006 | Dougherty et al. |
| 7,006,116 B1 | 2/2006 | Meyers et al. |
| 7,035,583 B2 | 4/2006 | Ferrigno et al. |
| 7,068,860 B2 | 6/2006 | Kasabach et al. |
| 7,080,103 B2 | 7/2006 | Womack |
| 7,099,019 B2 | 8/2006 | Silverbrook et al. |
| 7,134,606 B2 | 11/2006 | Chou |
| 7,155,382 B2 * | 12/2006 | Boys ................................ 704/2 |
| 7,184,592 B2 | 2/2007 | Iga et al. |
| 7,193,618 B2 | 3/2007 | Morehouse |
| 7,202,861 B2 | 4/2007 | Lynggaard |
| 7,239,306 B2 | 7/2007 | Fahraeus et al. |
| 7,289,110 B2 | 10/2007 | Hansson |
| 7,295,193 B2 | 11/2007 | Fahraeus |
| 7,350,996 B2 | 4/2008 | Bielecki et al. |
| 7,409,089 B2 | 8/2008 | Simmons et al. |
| 7,421,439 B2 | 9/2008 | Wang et al. |
| 7,453,447 B2 | 11/2008 | Marggraff et al. |
| 7,922,099 B1 | 4/2011 | Schmidt et al. |
| 7,936,339 B2 | 5/2011 | Marggraff et al. |
| 2001/0015721 A1 | 8/2001 | Byun et al. |
| 2001/0024193 A1 | 9/2001 | Fahraeus |
| 2001/0051329 A1 | 12/2001 | Lynch et al. |
| 2002/0000468 A1 | 1/2002 | Bansal |
| 2002/0001418 A1 | 1/2002 | Fahraeus et al. |
| 2002/0011989 A1 | 1/2002 | Ericson et al. |
| 2002/0021284 A1 | 2/2002 | Wiebe |
| 2002/0023957 A1 | 2/2002 | Michaelis et al. |
| 2002/0029146 A1 | 3/2002 | Nir |
| 2002/0041290 A1 | 4/2002 | LeKuch et al. |
| 2002/0044134 A1 | 4/2002 | Ericson et al. |
| 2002/0060665 A1 | 5/2002 | Sekiguchi et al. |
| 2002/0076683 A1 * | 6/2002 | Chen ............................ 434/317 |
| 2002/0077902 A1 | 6/2002 | Marcus |
| 2002/0083101 A1 | 6/2002 | Card et al. |
| 2002/0087598 A1 | 7/2002 | Carro |
| 2002/0113802 A1 | 8/2002 | Card et al. |
| 2002/0113823 A1 | 8/2002 | Card et al. |
| 2002/0118230 A1 | 8/2002 | Card et al. |
| 2002/0120854 A1 | 8/2002 | LeVine et al. |
| 2002/0193975 A1 | 12/2002 | Zimmerman |
| 2002/0197589 A1 | 12/2002 | Wood et al. |
| 2003/0001020 A1 | 1/2003 | Kardach |
| 2003/0013073 A1 | 1/2003 | Duncan et al. |
| 2003/0013483 A1 | 1/2003 | Ausems et al. |
| 2003/0014615 A1 | 1/2003 | Lynggaard |
| 2003/0016210 A1 | 1/2003 | Soto et al. |
| 2003/0016212 A1 | 1/2003 | Lynggaard |
| 2003/0020629 A1 | 1/2003 | Swartz et al. |
| 2003/0024975 A1 | 2/2003 | Rajasekharan |
| 2003/0025951 A1 | 2/2003 | Pollard et al. |
| 2003/0028451 A1 | 2/2003 | Ananian |
| 2003/0029919 A1 | 2/2003 | Lynggaard et al. |
| 2003/0040310 A1 | 2/2003 | Barakat et al. |
| 2003/0046256 A1 | 3/2003 | Hugosson et al. |
| 2003/0052900 A1 | 3/2003 | Card et al. |
| 2003/0067427 A1 | 4/2003 | Comiskey et al. |
| 2003/0071850 A1 | 4/2003 | Geidl |
| 2003/0080948 A1 | 5/2003 | Lapstun et al. |
| 2003/0087219 A1 | 5/2003 | Berger et al. |
| 2003/0089777 A1 | 5/2003 | Rajasekharan et al. |
| 2003/0090477 A1 | 5/2003 | Lapstun et al. |

| | | |
|---|---|---|
| 2003/0095098 A1 | 5/2003 | Paul et al. |
| 2003/0112220 A1 | 6/2003 | Yang et al. |
| 2003/0133164 A1 | 7/2003 | Tsai |
| 2003/0134257 A1 | 7/2003 | Morsy et al. |
| 2003/0162162 A1 | 8/2003 | Marggraff |
| 2003/0173405 A1 | 9/2003 | Wilz, Sr. et al. |
| 2003/0195820 A1 | 10/2003 | Silverbrook et al. |
| 2003/0208410 A1 | 11/2003 | Silverbrook et al. |
| 2003/0218604 A1 | 11/2003 | Wood et al. |
| 2003/0234824 A1 | 12/2003 | Litwiller |
| 2004/0012198 A1 | 1/2004 | Brotzell et al. |
| 2004/0022454 A1 | 2/2004 | Kasabach et al. |
| 2004/0023200 A1 | 2/2004 | Blume |
| 2004/0029092 A1 | 2/2004 | Orr et al. |
| 2004/0039750 A1 | 2/2004 | Anderson et al. |
| 2004/0043365 A1 | 3/2004 | Kelley et al. |
| 2004/0043371 A1 | 3/2004 | Ernst et al. |
| 2004/0084190 A1 | 5/2004 | Hill et al. |
| 2004/0091842 A1 | 5/2004 | Carro |
| 2004/0104890 A1 | 6/2004 | Caldwell et al. |
| 2004/0121298 A1 | 6/2004 | Creamer et al. |
| 2004/0140966 A1 | 7/2004 | Marggraff et al. |
| 2004/0164975 A1 | 8/2004 | Ho et al. |
| 2004/0167895 A1 | 8/2004 | Carro |
| 2004/0169695 A1 | 9/2004 | Forman |
| 2004/0202987 A1 | 10/2004 | Scheuring et al. |
| 2004/0219501 A1 | 11/2004 | Small et al. |
| 2004/0229195 A1 | 11/2004 | Marggraff et al. |
| 2004/0259067 A1 | 12/2004 | Cody et al. |
| 2005/0002053 A1 | 1/2005 | Meador et al. |
| 2005/0005246 A1 | 1/2005 | Card et al. |
| 2005/0013487 A1 | 1/2005 | Clary et al. |
| 2005/0022130 A1 | 1/2005 | Fabritius |
| 2005/0024322 A1 | 2/2005 | Kupka |
| 2005/0024346 A1 | 2/2005 | Dupraz et al. |
| 2005/0055628 A1 | 3/2005 | Chen et al. |
| 2005/0060644 A1 | 3/2005 | Patterson |
| 2005/0082359 A1 | 4/2005 | Marggraff et al. |
| 2005/0083316 A1 | 4/2005 | Brian et al. |
| 2005/0106547 A1 | 5/2005 | Chiu |
| 2005/0131803 A1 | 6/2005 | Lapstun et al. |
| 2005/0134926 A1 | 6/2005 | Takezaki et al. |
| 2005/0135678 A1 | 6/2005 | Wecker et al. |
| 2005/0138541 A1 | 6/2005 | Euchner et al. |
| 2005/0165663 A1 | 7/2005 | Razumov |
| 2005/0188306 A1 | 8/2005 | Mackenzie |
| 2005/0198208 A1* | 9/2005 | Nystrom ............ 709/219 |
| 2005/0208458 A1 | 9/2005 | Smith et al. |
| 2005/0211783 A1 | 9/2005 | Chou |
| 2005/0214730 A1* | 9/2005 | Rines ............... 434/318 |
| 2006/0033725 A1 | 2/2006 | Marggraff et al. |
| 2006/0067576 A1 | 3/2006 | Marggraff et al. |
| 2006/0067577 A1 | 3/2006 | Marggraff et al. |
| 2006/0080609 A1 | 4/2006 | Marggraff |
| 2006/0125805 A1 | 6/2006 | Marggraff |
| 2006/0126105 A1 | 6/2006 | Sedky et al. |
| 2006/0127872 A1 | 6/2006 | Marggraff |
| 2006/0146029 A1 | 7/2006 | Diercks |
| 2006/0159345 A1 | 7/2006 | Clary et al. |
| 2006/0168261 A1 | 7/2006 | Serval et al. |
| 2006/0242562 A1 | 10/2006 | Wang et al. |
| 2006/0269168 A1 | 11/2006 | Kasabach et al. |
| 2007/0003168 A1 | 1/2007 | Oliver |

FOREIGN PATENT DOCUMENTS

| | | |
|---|---|---|
| CN | 1520542 | 8/2004 |
| CN | 1655184 | 8/2005 |
| EP | 0495618 | 7/1992 |
| EP | 0519714 | 12/1992 |
| EP | 0539053 | 4/1993 |
| EP | 0697780 | 2/1996 |
| EP | 0866397 | 9/1998 |
| EP | 0973314 | 1/2000 |
| EP | 1256090 | 11/2002 |
| EP | 1256091 | 11/2002 |
| EP | 1315085 | 5/2003 |
| EP | 1416426 | 5/2004 |
| EP | 1681624 | 7/2006 |
| FR | 2811130 | 1/2002 |
| GB | 2202664 | 9/1988 |
| JP | 57238486 | 8/1980 |
| JP | 5137846 | 6/1993 |
| JP | 5217688 | 6/1993 |
| JP | 6146516 | 5/1994 |
| JP | H06231466 | 8/1994 |
| JP | H08036452 | 2/1996 |
| JP | 1011639 | 4/1998 |
| JP | 11119790 | 4/1999 |
| JP | 2000247074 | 9/2000 |
| JP | 2000293303 | 10/2000 |
| JP | 2001184291 | 7/2001 |
| JP | 2002297308 | 10/2002 |
| JP | 2003528402 | 9/2003 |
| JP | 2004503840 | 2/2004 |
| JP | 2007296387 | 11/2007 |
| KR | 2002009615 | 2/2002 |
| KR | 20020033775 | 5/2002 |
| WO | 9957648 | 11/1999 |
| WO | 00/73983 | 12/2000 |
| WO | 01/01670 | 1/2001 |
| WO | 01/16691 | 3/2001 |
| WO | 01/26032 | 4/2001 |
| WO | 0148685 | 7/2001 |
| WO | 0161455 | 8/2001 |
| WO | 01/71475 | 9/2001 |
| WO | 0167222 | 9/2001 |
| WO | 0169917 | 9/2001 |
| WO | 0171653 | 9/2001 |
| WO | 0171743 | 9/2001 |
| WO | 01/75723 | 10/2001 |
| WO | 01/75773 | 10/2001 |
| WO | 01/75780 | 10/2001 |
| WO | 0183213 | 11/2001 |
| WO | 0186612 | 11/2001 |
| WO | 01/95559 | 12/2001 |
| WO | 0242894 | 5/2002 |
| WO | 03001357 | 1/2003 |
| WO | 03001475 | 1/2003 |
| WO | 03067553 | 8/2003 |
| WO | 03083763 | 10/2003 |
| WO | 03094489 | 11/2003 |
| WO | 2004084190 | 9/2004 |

OTHER PUBLICATIONS

Robertson G.G et al:,"Buttons As First Class Objects on an X Desktop", Nov. 11, 1991, UIST '91.4TH Annual Symposium on user interface software and technology. Proceedings of the ACM Symposium on user interface and technology. Hilton Head, SC, Nov. 11-13, 1991, ACM symposium on user interface software and technology, New Yo, pp. 35-44, XP000315064.

Steve Silberman, "The Hot New Medium: Paper", Apr. 2001, Wired, Issue 9.04.

Stifelman, Lisa J. Augmenting Real-World Objects: A Paper-Based Audio Notebook. 1993. Speech Research Group, MIT Media Laboratory, Cambridge MA.

The Tools of Progress. [Jun. 19, 2001] [Retrieved Jun. 19, 2001] [Retrieved from the Internet] <URL:http://www.anoto.com/printsub.--page.asp?cid=22>.

Web page; "Scan-A-Page or Word Lets Students Hear What They're Attempting to Read;" at URL=http://www.brighteye.com/home.htm; printed Mar. 13, 2003; 1 page.

Web Page; "What Works: Optical Scanner Pens;" at URL=http://newsletters.fen.com/whatworks/items/front/0,2551,1-13751-3366-3,00.html; printed Mar. 13, 2003; 2 pages.

"New Preschool Toys From Fisher-Price Give a Voice to Fun, Creativity and Interactive Play This Holiday Season", Mattel, Inc.: Investor Relations, http://www.shareholdercom/mattel/news/20000601-43282.cfm, 3pp.

English Translation of Patent Abstract for JP7-296387 [Retrieved Feb. 27, 2008] Retrieved Online from {Japanese} National Center for Industrial Property Information and Training's Industrail Property Digital Libaray (IPDL> <URL: http://www.inipit.go.jp/PA1/result/detail/main/wAAAkaa44DA407296387P1.htm->.

* cited by examiner

TECHNIQUES FOR INTERACTIVELY COUPLING ELECTRONIC CONTENT WITH PRINTED MEDIA

BACKGROUND OF THE INVENTION

A number of techniques for interacting with content printed on encoded media have been developed. In one technique, content is printed or written on paper containing an electro-optically readable coding pattern. The coding pattern is utilized to determine position information which can be utilized to interact with the content thereon. However, there is a substantial amount of content that has not been disseminated on non-encoded paper. Without being able to determine position information, it is difficult to deliver interactive electronic content related to such printed or written content. It is also undesirable to reproduce the substantial volume of existing literary work on encoded paper. Therefore, what is needed is a technique for delivering electronic content in an interactive session with related content printed on non-encoded media.

SUMMARY OF THE INVENTION

Embodiments of the present invention are directed toward systems and methods for interactively coupling electronic content with printed or written content. In one embodiment, the techniques include receiving an identifier of a particular written or printed content utilizing a control panel that is printed on encoded media. Electronic content related to the written or printed content may then be interactively delivered.

In another embodiment, a pre-printed control panel includes a plurality of graphics, wherein each graphics overlays a unique coded pattern. Each coded pattern is associated with a particular function or datum. A given graphic may represent a button, key, alphabetic character, numeric character, symbol, figure or the like for invoking the function or input the datum associated with the coded pattern that it overlays.

In yet another embodiment, a computing device includes an optical tracking interface adapted to receive one or more encoded patterns from a printed control panel. A processor of the computing device determines an identifier of a written or printed content from the received encoded patterns. The processor interactively delivers electronic content related to the identified written or printed content.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
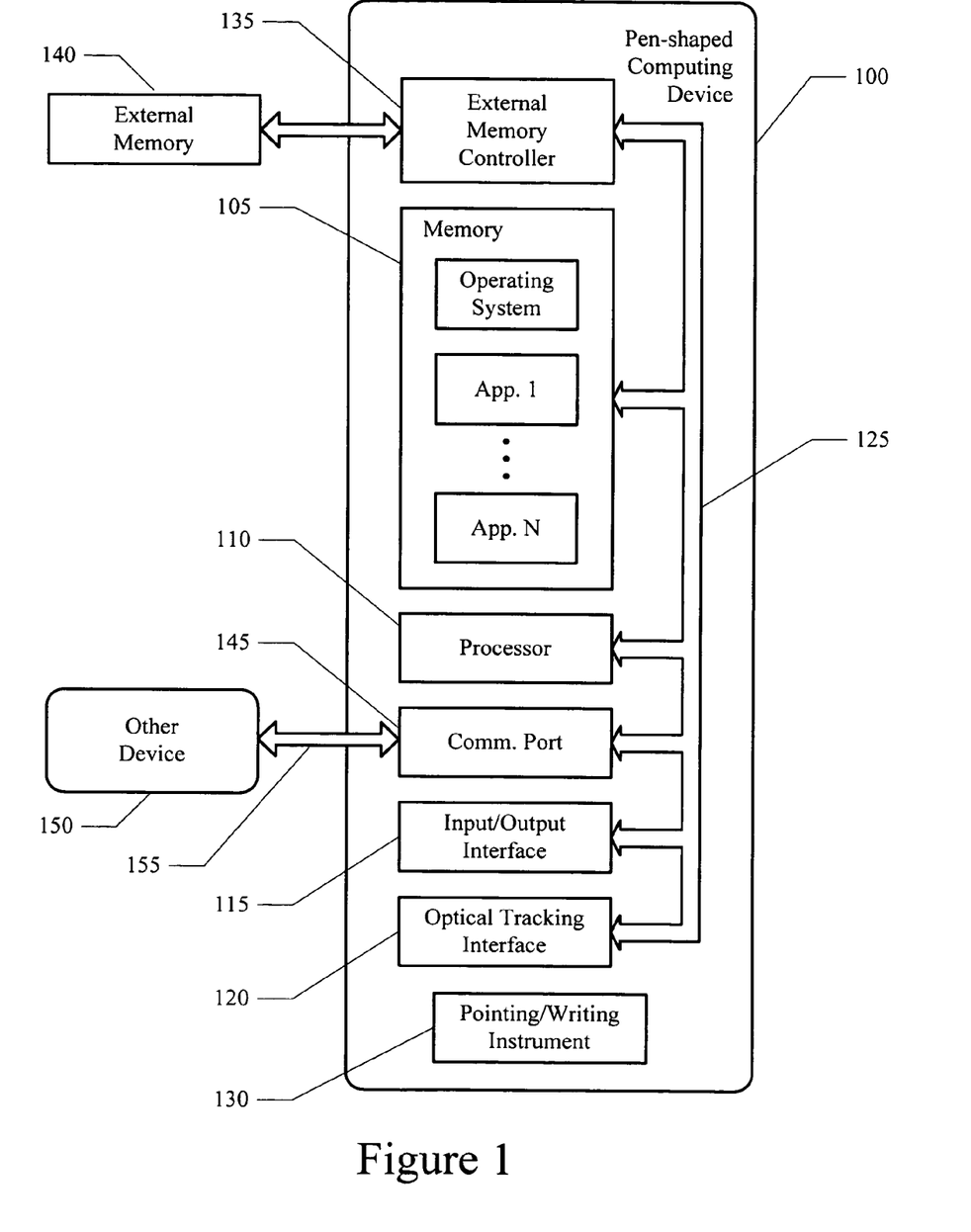
FIG. 1 shows a block diagram of a computing device upon which embodiments of the present invention can be implemented.

FIG. 1 shows a block diagram of a computing device 100 upon which embodiments of the invention can be implemented. In general, computing device 100 may have a form factor similar to a pen, stylus or the like. The computing device 100 includes system memory 105, a processor 110, an input/output interface 115, an optical tracking interface 120, one or more buses 125, and a pointing and/or writing instrument 130. The system memory 105, processor 110, input/output interface 115 and optical tracking interface 120 are communicatively coupled to each other by the one or more buses 125.

The memory 105 may include one or more well known computer-readable media, such as static or dynamic read only memory (ROM), random access memory (RAM), flash memory, magnetic disk, optical disk and/or the like. The memory 105 may be used to store one or more sets of instructions and data that, when executed by the processor 110, cause the computing device 100 to perform the techniques for interactively coupling electronic media with printed or written media as described herein.

The computing device 100 may further include an external memory controller 135 for removably coupling an external memory 140 to the one or more busses 125. The external memory may be used to store various electronic content for use by the computing device 100. The computing device 100 may also include one or more communication ports 145 communicatively coupled to the one or more busses 125. The one or more communication ports can be used to communicatively couple the computing device 100 to one or more other devices 150. The computing device 110 may be communicatively coupled to other devices 150 by a wired communication link and/or a wireless communication link 155. Furthermore, the communication link may be a point-to-point connection and/or a network connection. The communications ports may be used to receive various electronic content from the other devices 150.

The input/output interface 115 may include one or more electro-mechanical switches operable to receive commands and/or data from a user. The input/output interface 115 may also include one or more audio devices, such as a speaker, a microphone, and/or one or more audio jacks for removably coupling an earphone, headphone, external speaker and/or external microphone. The audio device is operable to output audio content and information and/or receiving audio content, information and/or instructions from a user. The input/output interface 115 may optionally include video devices, such as an LCD display for displaying alphanumeric and/or graphical information and/or a touch screen display for displaying and/or receiving alphanumeric and/or graphical information.

The optical tracking interface 120 includes a light source or optical emitter and a light sensor or optical detector. The optical emitter may be a light emitting diode (LED) and the optical detector may be a charge coupled device (CCD) or complementary metal-oxide semiconductor (CMOS) imager array, for example. The optical emitter illuminates a surface of a media or a portion thereof and light reflected from the surface is received at the optical detector.

Figure 2:
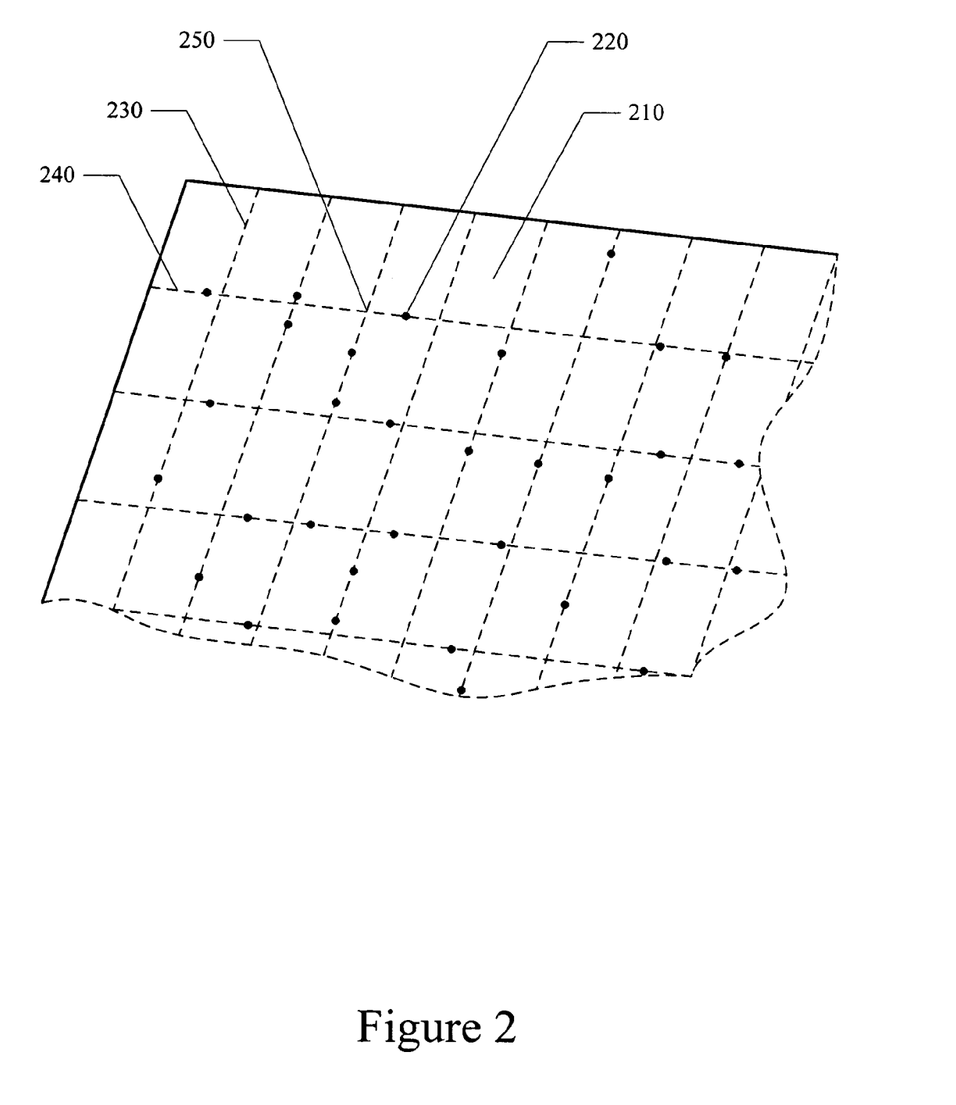
FIG. 2 shows an exemplary media provided with a coding pattern upon which embodiments of the present invention can be implemented.

The surface of the media may contain a pattern detectable by the optical detector. Referring now to FIG. 2, an exemplary media 210 provided with a coding pattern, upon which embodiments of the present invention can be implemented, is shown. In one implementation, the media 210 is provided with a coding pattern in the form of electro-optically readable position code that consists of a pattern of dots 220. The dots 220 may not be easily discernible by the human visual system, and may appear as grayscale on the sheet of paper. In one implementation, the pattern comprises a unique pattern of dots 220 printed on paper or other such media. The dots 220, for example, may have a nominal spacing of 0.3 millimeters, with 669,845,157,114,773,458,169 dots encompassing an area in excess of 4.6 million square kilometers, which corresponds to about 73 trillion letter-size pages. The "encoded paper" may be subdivided into unique sections. Different sections can be used (e.g., licensed) by different entities.

As the pointing and/or writing instrument 130 and the optical tracking interface 120 move together relative to the surface, successive images are captured. The optical detector, for example, may take snapshots of the surface 100 times a second or more. By analyzing the images, position on the surface and movement relative to the surface of the media can be tracked. In one implementation, the optical detector fits the dots to a reference system in the form of a raster with raster lines 230, 240 that intersect at raster points 250. Each of the dots 220 is associated with a raster point. For example, the dot 220 is associated with raster point 250. For the dots 220 in an image, the displacement of a dot 220 from the raster point 250 associated with the dot 220 is determined. Using these displacements, the pattern in the image is compared to patterns in the reference system. Each pattern in the reference system is associated with a particular location on the surface. Thus, by matching the pattern in the image with a pattern in the reference system, the position of the writing instrument 130 relative to the surface can be determined.

By interpreting the positions of the dots 220 captured in each snapshot, the operating system and/or one or more applications executing on the computing device 100 can precisely determine the position (e.g., position in a unique region) of the computing device 100 in two dimensions. That is, for example, an x-coordinate and a y-coordinate corresponding to the position of the pointing and/or writing instrument 130 relative to the page (e.g., surface) can be determined. Furthermore, as the pointing and/or writing instrument 130 and the optical detector move together relative to the surface, the direction and distance of each movement can be determined from successive position data.

In addition, different regions of the pattern can be assigned different function, and software programs and applications may assign functionality to the various patterns of dots within a respective region. Therefore, by placing the optical detector in a particular position on the surface and performing some type of actuating event, a specific instruction, command, function, data or the like associated with the position can be entered and/or executed. For example, the pointing and/or writing instrument 130 may be mechanically coupled to an electro-mechanical switch of the input/output interface 115. Therefore, double tapping substantially the same position is detected by the electro-mechanical switch in combination with the position determined by the optical detector as an input that can cause data or a function associated with the particular position to be received or executed, respectively.

The writing element 130 can be, for example, a pen, pencil, stylus, marker or the like, and may or may not be retractable. In one or more instances, a user can use the writing element 130 to make strokes on the surface, including letters, numbers, symbols, figures and the like. These user-produced strokes can be captured (e.g., imaged and/or tracked) and interpreted by the computing device 100 according to their position on the surface on the encoded media. The position of the strokes can be determined using the pattern of dots on the surface. The strokes can also be interpreted by the computing device 100 using optical character recognition (OCR), handwriting recognition and/or handwriting understanding techniques that recognize handwritten characters (or 'written signals').

A user, in one implementation, uses the writing element 130 to create a character "M" at a given position on the encoded media. The user may or may not create the character in response to a prompt from the computing device 100. In one implementation, when the user creates the character, device 100 records the pattern of dots that are uniquely present at the position where the character is created. The computing device 100 associates the pattern of dots with the character just captured. When computing device 100 is subsequently positioned over the "M," the computing device 100 recognizes the particular pattern of dots associated therewith and recognizes the position as being associated with an "M." In effect, the computing device 100 recognized the presence of the character using the pattern of markings at the position where the character is located, rather then by recognizing the character itself.

In another implementation, the computing device 100 analyzes the pattern of dots that are uniquely present at the position where the character is created (e.g., stroke data). Using a character recognition application, the stroke data captured by analyzing the pattern of dots can be read and translated into the character "M."

In another implementation, a character is associated with a particular command. For example, a user can write a character composed of a circled "M" that identifies a particular command, and can invoke that command repeatedly by simply positioning the optical detector over the written character. In other words, the user does not have to write the character for a command each time the command is to be invoked; instead, the user can write the character for a command one time and invoke the command repeatedly using the same written character.

In another implementation, the encoded paper may be preprinted with one or more graphics at various locations in the pattern of dots. For example, the graphic may be a preprinted graphical representation of a button. The graphics lies over a pattern of dots that is unique to the position of the graphic. By placing the optical detector over the graphic, the pattern of dots underlying the graphics are read (e.g., scanned) and interpreted, and a command, instruction, function or the like associated with that pattern of dots is implemented by the computing device 100 or data associated with that pattern is received as an input by the computing device 100. Furthermore, some sort of actuating event or movement may be performed using the computing device 100 in order to indicate that the user intends to invoke the command, instruction, function or the like associated with the graphic and/or receive the data as an input.

In yet another implementation, the optical tracking interface 120 may be used to read a barcode. By analyzing the pattern of the barcode, the optical detector in combination with the processor 110, executing an applicable application, can determine one or more data and/or one or more commands associated with the particular barcode. For example, the bar code on the back of the book may be decoded to determine what book it is.

Figure 3:
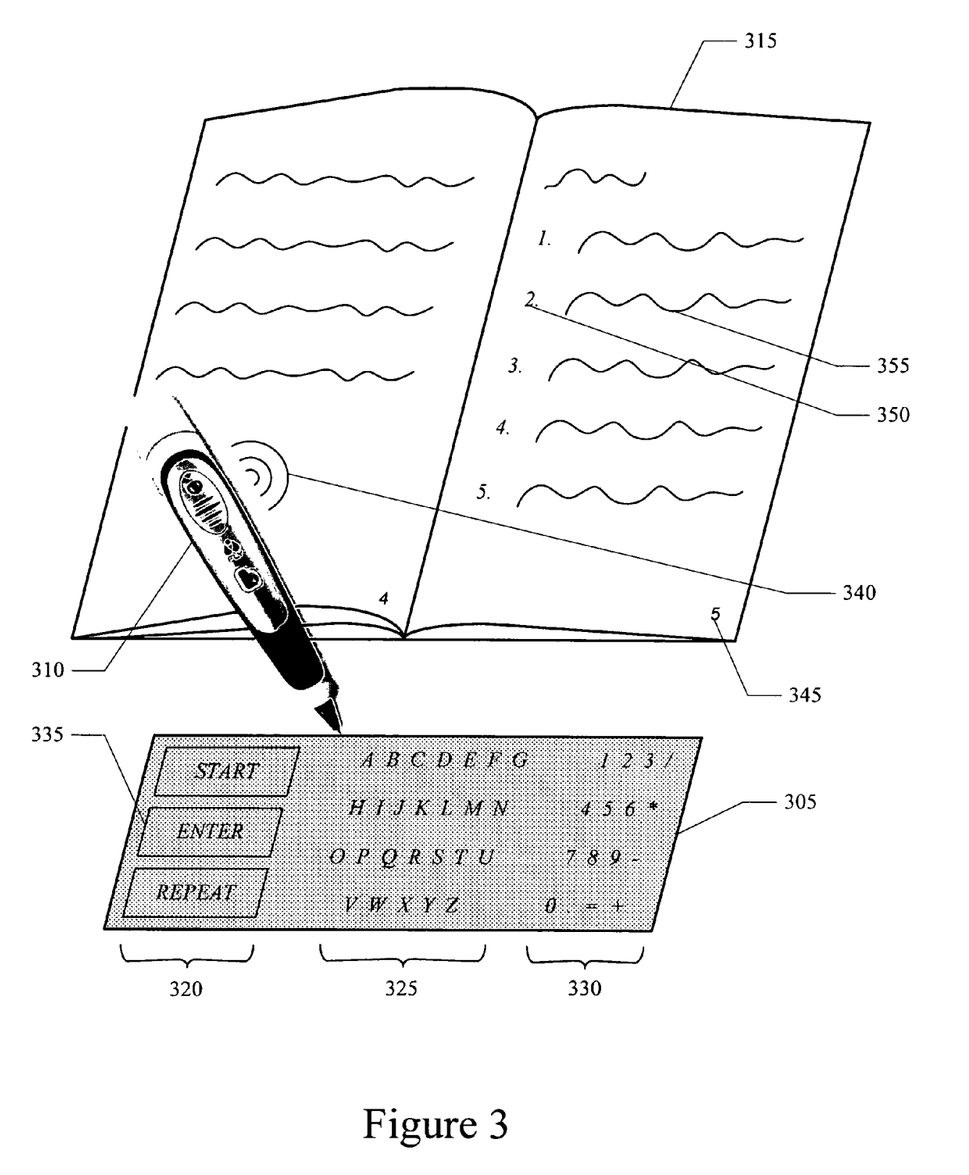
FIG. 3 illustrates an exemplary use of a control panel printed on encoded media that enables interaction between a computing device and conventional media, in accordance with one embodiment of the present invention.

Referring now to FIG. 3, an exemplary use of a control panel printed on encoded media 305 that enables interaction between a computing device 310 and conventional media 315, in accordance with one embodiment of the present invention, is illustrated. The conventional media 315 may include printed or written content, including text and graphics, utilized to disseminate literary work.

The control panel printed on encoded media 305 may include one or more graphics at various regions in the coding pattern. The pattern of dots underlying each graphic may be associated with a given datum or function. The graphics may include graphical representations of one or more bottoms, one or more icons, one or more keys, one or more alphabetic characters, one or more numeric characters, one or more designs, one or more symbols, one or more figures and/or the like. For example, the control panel 305 may include graphical representations of "start," "enter," and "repeat" buttons 330. The underlying pattern of dots corresponding to the particular graphical representation of the "enter" button is pre-associated with an input for invoking an enter function in one or more application running on the pen-shaped computing device. Accordingly, when a user taps on the "enter" button an enter function is performed. The control panel 305 may also, for example, include a plurality of alphabetic characters 325. The underlying pattern of dots proximate a given alphabetic character is pre-associated with the particular letter. Accordingly, when a user taps on the "J" graphic, a computing device-readable representation of the letter J is received as an input.

It is appreciated that the illustrated control panel on encoded media 305 is for illustration only and is not intended to limit the scope of the invention. Instead, the control panel may include graphical representation of any number and/or combination of pre-associated functions, data, and open input regions. Furthermore, the pattern of dots visible in the exemplary control panel 305 is for illustrative purposes. Normally, the dot pattern would not be easily discernable to a user.

The control panel 305 may be produced on encoded media, such as paper, cardboard, plastic or the like. The coding pattern on the media is electro-optically readable by the computing device 310. The control panel may have a form factor of a card, sheet, book mark, poster, folder, pamphlet, leaflet, folio, journal or the like. The form fact of the control panel may have dimensions the same as or similar to a business card, postcard, book marker, standard page size, book cover. In one implementation, a first set of controls (e.g., graphics) may be printed on a first surface of the control panel 305 and a second set of controls (e.g., graphics) may be printed on a second surface. In another implementation, the controls may be printed in a first orientation (e.g., portrait) on a first surface and the same controls may be printed in a second orientation (e.g., landscape) on a second surface.

The user may hold the computing device 310 in a similar manner to holding a pen, and therefore it may be referred to as a pen-shaped computing device 310. In particular, as the user points, taps, writes or the like with the pen-shaped computing device 310, the Operating System (OS) or another application collects position information associated with the user's actions on the encoded control panel. The optical tracking interface 120 of the pen-shaped computing device 310, for example, may take snapshots of the surface of the encoded control panel 305 approximately 10-1000 times per second. By analyzing the images of the position code, movement relative to the surface can be tracked. The relative movement can be used to capture the selection of functions and/or input of data that are pre-associated with particular regions of the encoded pattern, and/or stroke data (e.g., writing) in open input regions.

In one example, a student may enter the international standard book number (ISBN) of a work book by tapping on the corresponding alphanumeric keys 325, 330 printed on the control panel 305. The student may then tap enter 335 on the control panel 305 using the pen-shaped computing device 310. The student may enter the international standard book number (ISBN) in response to an audio prompt 340. The prompt 340 may be generated when a particular application is launched on the pen-shaped computing device 310 by the student. The pen-shaped computing device 310 utilizes the ISBN to determine which book is being used by the student. The student may also enter the page number 345 and then tap enter 335 to begin at a given page within the book. The student may then receive interactive audio content corresponding to the given page in the book from the pen-shaped computing device 310. For example, the portion of the content corresponding to the indicated page could be output by the pen-shaped computing device 310 as an audio file 340.

In another implementation, the student may enter the tile of the book using the graphical representation of the alphabetic characters 3325, instead of the ISBN. In yet another implementation, the student may use the optical tracking interface 120 to scan a barcode on the book. An application executing on the processor 110 may determine the identity of the particular book from the barcode.

Figure 4:
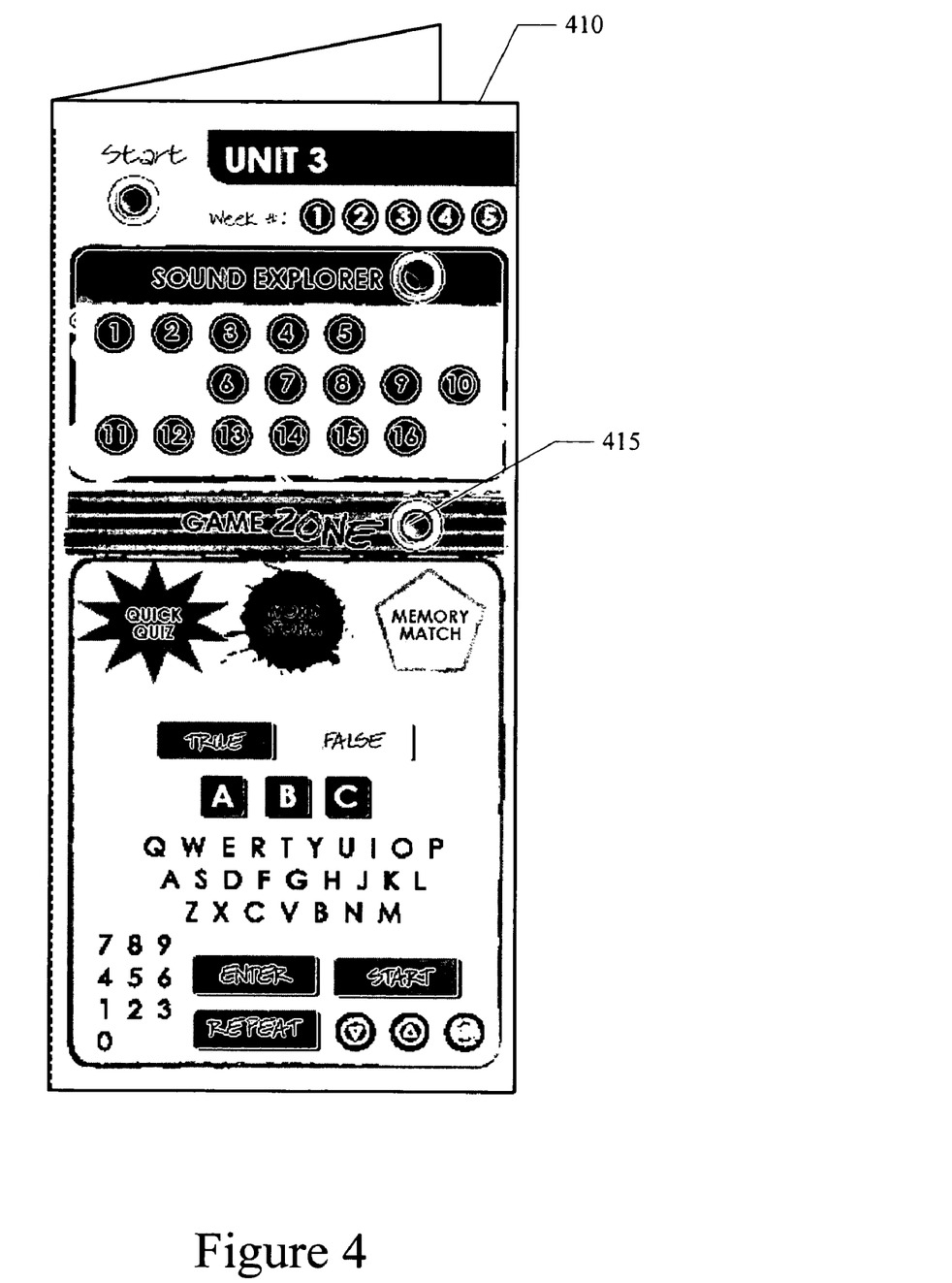
FIG. 4 illustrates a first sub-control panel of an exemplary control panel, in accordance with one embodiment of the present invention.
Figure 5:
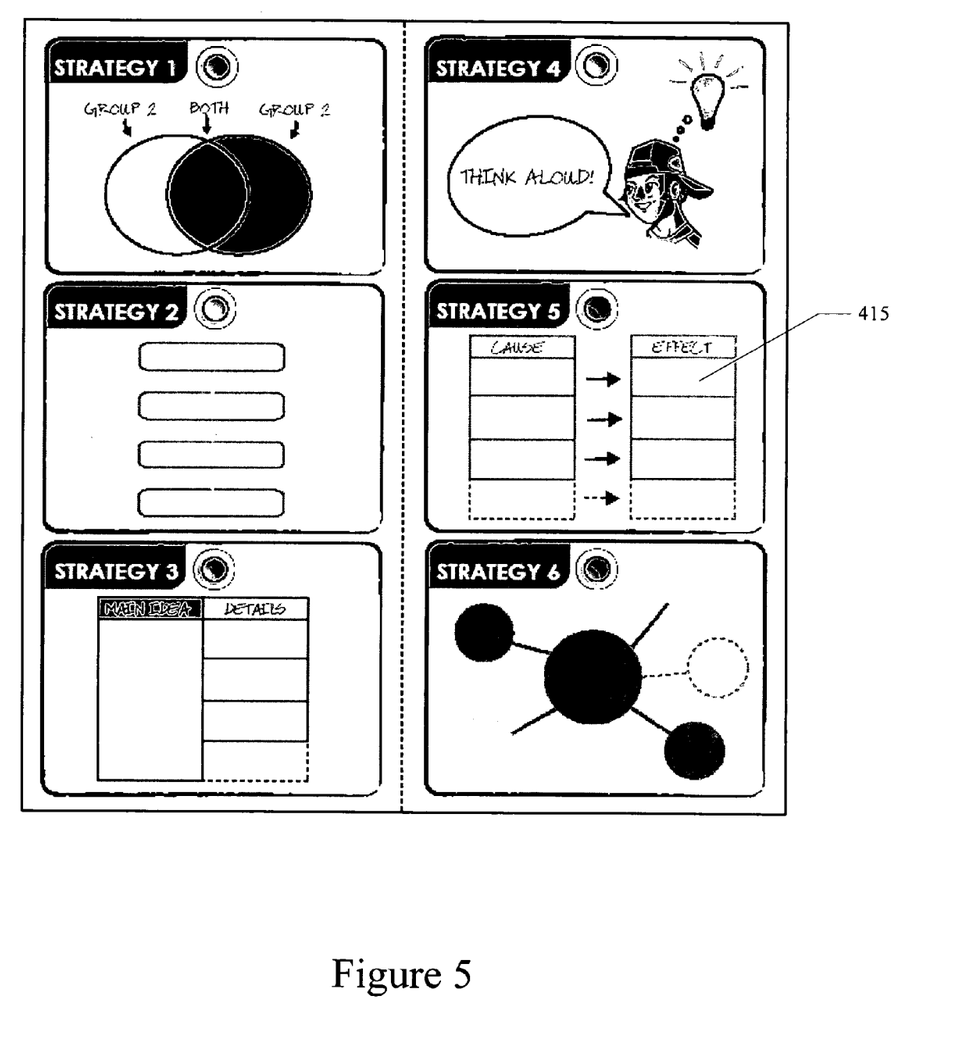
FIG. 5 illustrates a second and third sub-control panel of an exemplary control panel, in accordance with one embodiment of the present invention.

Another exemplary control panel is illustrated in FIGS. 4 and 5. The illustrated control panel 410 may be in the shape of a pamphlet. A first sub-control panel is printed on the first surface (e.g., front) of the pamphlet, as depicted in FIG. 4. A second sub-control panel is printed on the left inside panel and a third sub-control panel is printed on the right inside panel of the pamphlet, as depicted in FIG. 5. The first sub-control panel may include common functions represented by graphical buttons, such as start, enter and repeat buttons. The first sub-control panel may also include general alphabetic and numeric data entry buttons. The first sub-control panel may also include additional graphical regions for invoking other functions and data, such as activity selection buttons 415 and the like. The other sub-control panels may include one or more of the same graphical buttons that are on the first sub-control panel and also additional graphics for invoking other functions and/or entering other data. Any of the sub-panels may also include open input regions 510 for capturing hand written inputs from the user.

A user, such as a student, may use the control panel 410 to interactively couple electronic content with printed or written content. In particular, the student may receive audio content 340 from the pen-shaped computing device 310 related to the content in a given book 315. In one example, the student may take a quiz about the subject matter on a given page of the book using the pen-shaped computing device. The quiz question may be generated based upon the content of the book or may be those present in the book. For instance, the student may enter the page number 345 and question number 350 of a question 355 appearing in the book 315. The question may be output as an audio prompt and the student may use one or more graphical buttons, such as true and false buttons, multiple choice buttons or the like, to answer the question. The questions may be framed within an engaging theme, such as a quick quiz game, a word storm game, a memory match game or the like. The pen-shaped computing device 310 may also provide audio scaffolded hints for answering the questions, an indication of whether the answer provided by the student via the control panel 410 is correct or not, and other pedagogy.

In yet another example, a language button may be provided on the control panel. Selection of the language button may then provide interactive content in the native language of the user in accordance with a language selected during a configuration of the pen-shaped computing device or in response to an additional prompt when the language button is taped by the student. In addition, the control panel 410 may include audio control graphical buttons, such as up volume, down volume, mute and the like, to adjusting the audio output.

Figure 6:
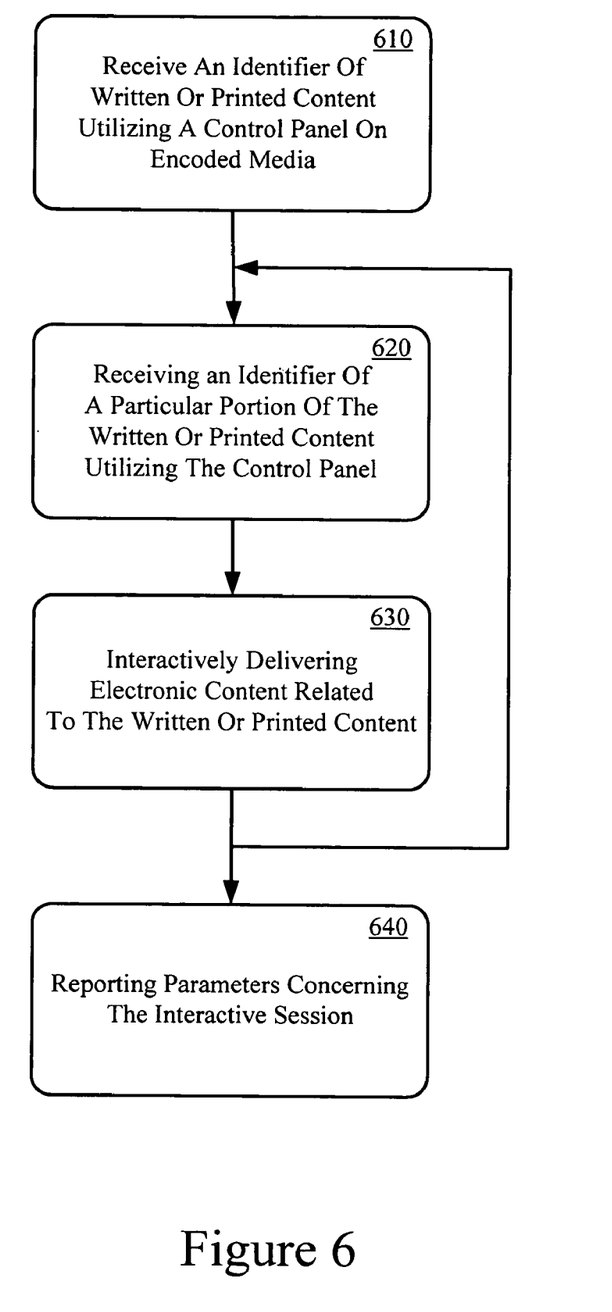
FIG. 6 a flow diagram of a method of using a control panel printed on one encoded media to interactively couple electronic media with printed media, in accordance with one embodiment of the present invention.

Referring now to FIG. 6, a method of using a control panel printed on encoded media to interactively couple electronic content with printed or written media, in accordance with one embodiment of the present invention is shown. The method includes receiving an identifier of written or printed content utilizing a control panel printed on encoded media, at 610. In one implementation, a user may input a title of the written or printed content by performing actuating events relative to one or more graphics overlaying particular position coded regions each of which is pre-associated with a particular function or datum. For instance, a user may tap on one or more graphical representations of alphanumeric keys to enter the title of a particular book. In another implementation, the user may input the ISBN of the book. In yet another implementation, the user may input a barcode identifying the book. In other implementations, the user may identify the content any number of other ways.

Optionally, the method may also include receiving one or more identifiers of a particular portion of the written or printed content, at 620. For instance, the user may enter a particular page number of the book, a range of page numbers, a chapter number, section identifier, a subsection identifier, a heading, a volume number, an issue number or the like, by tapping on the appropriate graphical representations of alphanumeric keys.

At 630, interactive electronic content related to the written or printed content is delivered. Furthermore, if a identifier of a particular portion of the written or printed content is received, a particular portion of the electronic content related to the particular portion of the written or printed content may be selectively delivered. In addition, if one or more identifiers of additional portions of the written or printed content are received, the additional portions of the electronic content related to the identified portions of the written or printed content may be delivered in response thereto.

The interactive electronic content may provide directed user activities and/or group activities. For example, the interactive content may include one or more contextually-relevant teaching points and sound effect that engage a student in the content of the conventional printed or written media. The teaching points may include factoids, quick reading comprehension suggestions and/or the like. Sound effects may be utilized to put the reader "in the world" that they are reading about and provide additional "entry points" for neural net recall.

The interactive content may also include touch diagram and other visual aids to provide help with strategies that may be challenging when a user is first asked to go it alone. The visual aids may include Venn diagrams, sequence charts, main idea/details, thinking aloud, cause-effect charts and/or the like. Use of the strategies are directly related to the content or a particular portion of the printed or written media.

The interactive content may also include engaging interactions such as game models, such as word storm, quick quiz, memory match and/or the like. For example, in word storm two or more users are given a category. Each user is given a period to generate a list of words that relate to some aspect of the content of the written or printed media. The user may write their list on encoded paper or plain paper. After the period ends the users compare lists and score based on the correctness, uniqueness and/or the like of their responses. In quick quiz, one or more users may answer true/false, multiple choice, free-entry 1-2 word answers in reading comprehension quizzes. In memory match a user may write audio hints in individual regions and then match pairs of audio clues. Such activities may encourage careful listening, group discussion, resolution of conflicts and ambiguities, compare and contrast analysis, creation of visual mnemonics and/or the like.

In one implementation, the interactive content provided by the computing device may be stored in the memory 105. In another implementation, the interactive content provided by the computing device may be received via an external memory 140 such as a memory cartridge that can be removable coupled to the computing device. In yet another implementation, the interactive content may be received via a communication link with another computing device 150.

Optionally, the method may also include reporting parameters concerning the interactive session, at 640. In particular, logged information collected by the computing device 100 during one or more interactive sessions may be reported.

Embodiments advantageous enable a user to interact with written and printed media using a computing device. In particular, the control panel for non-encoded content can be used to enable interaction between a pen-shaped computing device and printed books, pamphlets and the like. Thus, content on conventional written and printed media is no longer static. Instead, the usefulness of content on non-encoded media is increased by use of the control panel printed on encoded media. The control penal also benefits publishers and users by reducing or eliminating the cost of re-publishing content on encoded media.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of interactively coupling electronic content with printed media:
   receiving, by a computing device, an identifier of a written or printed content on non-encoded media, utilizing a control panel printed on location encoded media, wherein the control panel is separate from the written or printed content; and
   interactively delivering, by the computing device, electronic content related to the written or printed content.

2. The method according to claim 1, wherein receiving the identifier of the written or printed content comprises receiving an international standard book number (ISBN) or a title.

3. The method according to claim 1, wherein interactively delivering electronic content comprises outputting an audio file of the written or printed content, a quiz related to the written or printed content, a hint or an answer, an audio file of the written or printed content in a native language of a user, a directed user activity, a group activity, a sound effect, a touch diagram, a visual aid or a game.

4. The method according to claim 1, further comprising:
   receiving an identifier, of a particular portion of the written or printed content, utilizing the control panel; and
   interactively delivering a particular portion of the electronic content related to the particular portion of the written or printed content.

5. The method according to claim 4, wherein receiving the identifier of the particular portion of the written or printed content comprises receiving a page number, a range of page numbers, a chapter number, a section identifier, a subsection identifier, a heading, a volume number or an issue number.

6. The method according to claim 4, further comprising:
   receiving an identifier, of an additional portion of the written or printed content, utilizing the control panel; and
   interactively delivering an additional portion of the electronic content related to the additional portion of the written or printed content.

7. The method according to claim 1, further comprising reporting parameters concerning an interactive session.

8. An article of manufacture comprising a printed control panel to control interactive delivery of electronic content by a computing device related to written or printed content on non-encoded media, the control panel including a plurality of graphical representations, wherein each graphical representation corresponds to a particular function or datum and wherein each graphical representation overlays a particular region of a position encoding pattern associated with the particular function or datum, wherein the position encoding pattern is adapted to be electro-optically read by the computing device, and the printed control panel is separate from the written or printed content.

9. The pre-printed control panel of claim 8, wherein at least one graphical representation comprises a button, a key, an icon, an alphabetic character, a numeric character, a symbol or a figure.

10. The pre-printed control panel of claim 8, wherein the graphical representations are printed or written on media selected from a group consisting of paper, cardboard and plastic.

11. The pre-printed control panel of claim 10, wherein the media has a form factor selected from a group consisting of a card, a business card, a postcard, a book marker, a poster, a sheet, a folder, a book cover, a pamphlet, a leaflet, a folio and a journal.

12. The pre-printed control panel of claim 11, wherein the form factor comprises:
   a first surface having a first portion of the plurality of graphics printed thereon; and
   a second surface having a second portion of the plurality of graphics printed thereon.

13. The pre-printed control panel of claim 11, wherein the form factor comprises:
   a first surface having the plurality of graphical representations printed in a first orientation; and
   a second surface having the plurality of graphical representations printed in a second orientation.

14. A computing device comprising:
   an optical tracking interface adapted to receive one or more location encoding patterns from a printed control panel that includes a plurality of graphical representations, wherein each graphical representation corresponds to a particular function or datum and wherein each graphical representation overlays a unique location encoding pattern associated with the particular function or datum; and
   a processor, communicatively coupled to the optical tracking interface, for determining an identifier of written or printed content on non-encoded media from one or more functions and data associated with the one or more location encoding patterns received by the optical tracking interface from the printed control panel and interactively delivering electronic content related to the written or printed content, wherein the written or printed content is separate from the printed control panel.

15. The computing device of claim 14, further comprising a computing device-readable media, communicatively coupled to the processor, for storing the electronic content.

16. The computing device of claim 15, wherein the computing device-readable media comprises a memory cartridge.

17. The computing device of claim 14, further comprising a speaker, communicatively coupled to the processor, for interactively outputting the electronic content in an audio format.

18. The computing device of claim 14, further comprising a pointing and or writing instrument mechanically coupled to the optical tracking interface.

19. The computing device of claim 14, further comprising a communication port, communicatively coupled to the processor, for receiving the electronic content.

* * * * *